United States Patent
Sprunk (10) Patent No.: US 8,479,020 B2
(45) Date of Patent: Jul. 2, 2013

(54) METHOD AND APPARATUS FOR PROVIDING AN ASYMMETRIC ENCRYPTED COOKIE FOR PRODUCT DATA STORAGE

(75) Inventor: Eric Sprunk, Carlsbad, CA (US)

(73) Assignee: Motorola Mobility LLC, Libertyville, IL (US)

( * ) Notice: Subject to any disclaimer, the term of this patent is extended or adjusted under 35 U.S.C. 154(b) by 1407 days.

(21) Appl. No.: 11/782,721

(22) Filed: Jul. 25, 2007

(65) Prior Publication Data
US 2009/0028343 A1 Jan. 29, 2009

(51) Int. Cl.
*G06F 12/14* (2006.01)
*G06F 11/30* (2006.01)
*G06F 15/16* (2006.01)
*H04L 9/08* (2006.01)

(52) U.S. Cl.
USPC ............... 713/193; 380/286; 709/206

(58) Field of Classification Search
None
See application file for complete search history.

(56) References Cited

U.S. PATENT DOCUMENTS

| | | | |
|---|---|---|---|
| 6,118,874 A * | 9/2000 | Okamoto et al. | 380/282 |
| 6,266,416 B1 * | 7/2001 | Sigbjørnsen et al. | 380/255 |
| 6,959,390 B1 * | 10/2005 | Challener et al. | 713/194 |
| 2001/0036276 A1 * | 11/2001 | Ober et al. | 380/286 |
| 2004/0073954 A1 * | 4/2004 | Bjordammen et al. | 725/151 |
| 2004/0175000 A1 * | 9/2004 | Caronni | 380/285 |
| 2004/0236958 A1 * | 11/2004 | Teicher et al. | 713/193 |
| 2005/0141718 A1 * | 6/2005 | Yu et al. | 380/277 |
| 2005/0246778 A1 * | 11/2005 | Usov et al. | 726/28 |
| 2006/0093150 A1 * | 5/2006 | Reddy et al. | 380/282 |
| 2006/0126422 A1 * | 6/2006 | Takagi et al. | 365/232 |
| 2007/0276756 A1 * | 11/2007 | Terao et al. | 705/51 |
| 2007/0277234 A1 * | 11/2007 | Bessonov et al. | 726/10 |
| 2008/0273697 A1 * | 11/2008 | Greco et al. | 380/44 |

* cited by examiner

*Primary Examiner* — Nathan Flynn
*Assistant Examiner* — Trang Doan (57) ABSTRACT

A process may be utilized by a device to implement public key asymmetric encryption. The process encrypts a data set with a symmetric encryption key to form an encrypted data set. Further, the process encrypts the symmetric encryption key with a public key component of an asymmetric encryption key to form an asymmetric encrypted cookie. Finally, the process stores the encrypted data set and the asymmetric encrypted cookie in a non-secure area of a storage medium.

17 Claims, 7 Drawing Sheets

METHOD AND APPARATUS FOR PROVIDING AN ASYMMETRIC ENCRYPTED COOKIE FOR PRODUCT DATA STORAGE

BACKGROUND

1. Field

This disclosure generally relates to the field of data security. More particularly, the disclosure relates to encryption.

2. General Background

A device, such as a set top box, that receives data may utilize a data encryption key ("DEK") to protect streams of data or files that move about or are stored, either temporarily or permanently, within the device. Encryption of such data prevents access of the data by unauthorized parties who probe into the device or the data flowing through the device, or who remove and analyze a portion of the device, e.g., a hard drive.

After the device is manufactured, the DEK is utilized to communicate, repair, and/or upgrade the device. The device may utilize public key DEK technology so that the public DEK may be outputted upon a later request. However, public key methods are too slow to handle voluminous or high speed data. Accordingly, symmetric encryption has been utilized. A device that utilizes symmetric encryption utilizes a single non-public key DEK for both encryption and decryption. For instance, if a transmitting chip in a device utilizes a DEK to encrypt data for transmission, then the receiving chip in the device utilizes the exact same DEK to decrypt the data that is received. In order to facilitate operations such as communication, repair, and/or upgrade of the device at a future time, the DEK is stored on a storage medium. This storage medium may be stored in an insecure location that is subject to penetration or access by attackers.

Another current approach establishes a key recovery key ("KRK") in advance. The KRK is then utilized with a device DEK. However, the combination of the KRK with the device DEK may be inconvenient because a highly protected storage system, e.g., a secure server, should be available both at the time that the DEK is created and at a subsequent time when another device requests the device DEK. Further, the device DEK is sometimes created in a factory environment where maintenance of, or development investment in, a secure server may be burdensome. The long-term maintenance of a DEK server for multiple and unforeseeable future uses may also be inconvenient. Further, the long-term secure storage of a multitude of device DEKs for eventual use may be burdensome. The alternative of utilizing an insecure DEK server is fundamentally inappropriate as DEKs are valuable keys that should be protected everywhere they exist.

Another issue arises if a DEK server is not utilized in order to avoid the aforementioned inconveniences. Accordingly, if a DEK server is not utilized, the DEK is stored inside the device. Devices may vary in design, data storage security levels, and/or robustness. For instance, a device may have a hybrid design in which some data may be stored more securely than other data. As a result, an awkward reliability or failure recovery problem may arise with respect to redundant storage of secure data or related keys, e.g., DEKs. In a scenario where the secure portion, which stores the DEK, of a device fails, a number of current approaches inadequately recover the data protected by the DEK.

One current approach is to store the DEK in an additional location besides the secure portion of the device. This approach is fundamentally problematic because a secure item, e.g., the DEK, is stored in a non-secure storage, which is vulnerable. Such an approach defeats the basic purpose of having secure storage in the first place. The potential solution of having a DEK server as the additional secure location is unavailable with this approach as the assumption is that a DEK server is not utilized.

Another current approach is to forego any attempt at recovering the data protected by the DEK. This approach is also problematic as a fair assumption is that the data protected by the DEK is valuable to one party or another; otherwise, the data would not have been saved in the first place. For example, the data may be valuable to a consumer, who may have a library of encrypted home movies that he or she paid for and does not want to lose. As another example, the data may be valuable to a corporation that may not want to incur the cost of data loss and recovery.

An additional current approach is to encrypt the DEK for such insecure storage. In other words, a KRK is utilized and shared with any party or device that may eventually need to securely communicate with the device or access the DEK-encrypted data stored in the device. This approach attempts to utilize the KRK to protect a device DEK for sharing with another external device. Unfortunately, this approach does not actually achieve anything by itself. Since DEK encryption is itself protected by the KRK, this approach simply transfers the problem to the storage location of the KRK. Encryption does not achieve anything unless the key utilized in encryption is itself protected. This approach does not provide a mechanism to securely store all the encryption keys that are utilized. Accordingly, this approach does not provide adequate security.

SUMMARY

In one aspect of the disclosure, a process may be utilized by a device to implement public key asymmetric encryption. The process encrypts a data set with a symmetric encryption key to form an encrypted data set. Further, the process encrypts the symmetric encryption key with a public key component of an asymmetric encryption key to form an asymmetric encrypted cookie. Finally, the process stores the encrypted data set and the asymmetric encrypted cookie in a non-secure area of a storage medium.

In another aspect, a process may be utilized by an external device to assist in data recovery for the device. The process stores a private key component of an asymmetric encryption key on a storage medium external to a device. Further, the process decrypts, with a private key component of the asymmetric encryption key, an asymmetric encrypted cookie stored in a non-secure area of a storage medium internal to the device if a secure area of the storage medium internal to the device malfunctions.

In yet another aspect, a process may be utilized to encrypt a data set and provide data recovery in the event of a malfunction. The process encrypts a data set with a data encryption key to form an encrypted data set. Further, the process stores the data encryption key in a secure area of a storage medium in a device. In addition, the process encrypts the data encryption key with a public key component of a key recovery key to form an asymmetric encrypted cookie. The process stores the encrypted data set and the asymmetric encrypted cookie in a non-secure area of the storage medium in the device. Finally, the process retrieves a private key component of the key recovery key from a storage medium external to the device if the secure area of the storage medium in the device malfunctions.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

A method and apparatus, which utilize public key asymmetric encryption, are disclosed. Accordingly, a practical and cost-effective mechanism of utilizing a DEK in a device is provided to avoid unnecessary investment or manufacturing costs. For instance, the cost and inconvenience of a utilizing a DEK server may be avoided. Further, minimum security levels are maintained for protection of DEKs or related keys.

So, the essential contradiction is how to securely store a DEK or KRK securely, while still being in insecure storage.

Figure 1:
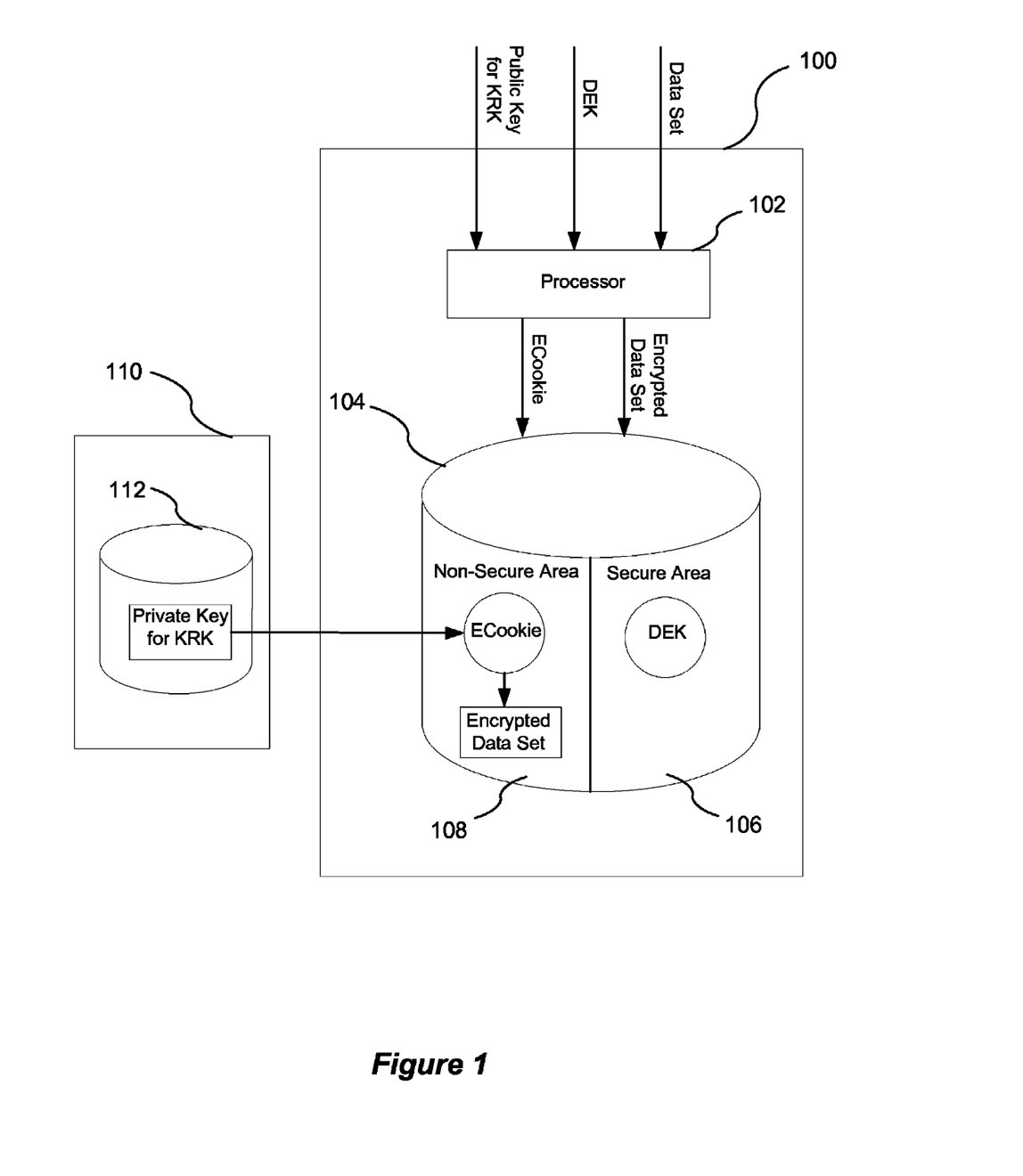
FIG. 1 illustrates a device that stores a data set

FIG. 1 illustrates a device 100 that stores a data set. The device 100 may be a set top box, hand held apparatus, computer, music player, or the like. Further, the data set may include audio data, visual data, or both.

The device 100 includes a processor 102 and a storage medium 104. The storage medium has a secure area 106 and a non-secure area 108. The processor 102 utilizes a DEK to encrypt the data set and stores the encrypted data set in the non-secure area 108. The processor 102 stores the DEK in the secure area 106 so that the processor 102 may decrypt the encrypted data set utilizing the DEK or encrypt future DEKs and/or related keys. In one embodiment, the device 100 receives a DEK from an external source. In another embodiment, the device 100 generates the DEK internally. The processor 102 utilizes a public key of a KRK, which has both a public key and a private key, to asymmetrically encrypt the DEK. The resulting cipher text is an asymmetric encrypted cookie ("ECookie"). In one embodiment, the processor 102 receives only the public key of the KRK, without the private key, from an external source. Accordingly, the device 100 may safely store enciphered DEKs or related keys as ECookies without the ability to decipher the ECookies. In another embodiment, the processor 102 generates the KRK internally, but only stores the public key in the device 100.

The processor 102 stores the ECookie in the non-secure area 108 of the storage medium 104 along with the encrypted data set. If the secure area 106 remains intact, the processor 102 may securely retrieve the DEK from the secure area 106 to decrypt the encrypted data set located in the non-secure area 108. If the secure area 106 malfunctions, an external device 110 that stores the private key of the KRK in a storage medium 112 may be utilized to decrypt the ECookie. As a result, the symmetric DEK may then be utilized to decrypt the encrypted data set.

If the non-secure area 108 fails, e.g. a hard disk or flash memory failure, the loss of the ECookie is irrelevant as the encrypted data set will also be lost. In other words, having the ECookie only matters if there is an encrypted data set that is intact to decrypt.

In one embodiment, the private key for the KRK is retained in a secure location that is separate from factories or repair locations. For instance, the private key for the KRK may be located at a Certificate Authority or equivalent high security digital bank. The private key for the KRK may then remain at the Certificate Authority or equivalent high security digital bank until a future need to decrypt an ECookie arises. Further, an additional security measure may be taken by creating KRKs infrequently. For instance, a KRK may be created once every few years. The KRK may also be created once for each product line or model of the device 100.

Accordingly, a secure server is no longer needed to provide effective data recovery in a secure manner. As long as the device 100 does not have a copy of the private key of the KRK, the ECookie is safe, even when stored in the non-secure area 108. The public key of the KRK does not allow decryption of the ECookie as a fundamental feature of asymmetric public key technology is that possession of a public key does not allow calculation of the corresponding private key, which in this instance is utilized for decryption of the DEK. Therefore, a secure server is not needed during product manufacture to protect the DEK, which is protected in the device 100 by the ECookie. The inconveniences of utilizing a secure server may, thereby, be alleviated.

Figure 2:
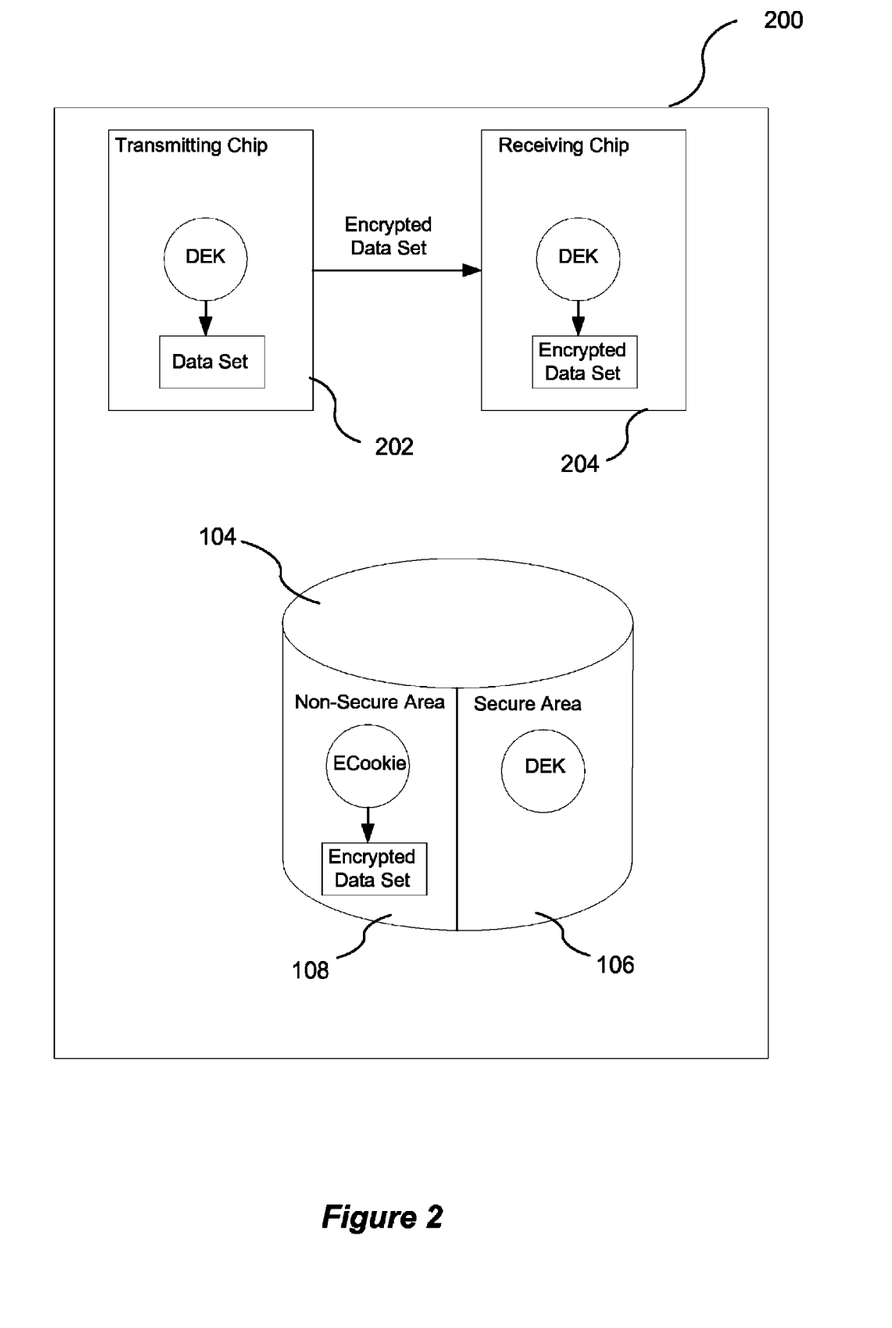
FIG. 2 illustrates a set top box that utilizes the public key asymmetric encryption.

FIG. 2 illustrates a set top box 200 that utilizes the public key asymmetric encryption. The set top box 200 utilizes interchip data encryption. In other words, encryption is utilized to protect data that is internally transmitted within the set top box 200 from a transmitting chip 202 to a receiving chip 204. The transmitting chip 202 utilizes a DEK to encrypt a data set so that an encrypted data set may be transmitted to the receiving chip 204. Further, the receiving chip 204 utilizes the DEK to decrypt the encrypted data set so that the receiving chip 204 may access the data set. The DEK is stored in the secure area 106 of the storage medium 104 in the set top box 200 so that each of the chips may securely utilize the DEK. A public key of a KRK may be utilized to encrypt the DEK into an ECookie, which is stored in the non-secure area 108 of the storage medium 104 in the set top box 200. As discussed above, an external device storing the private key of the KRK may be utilized to obtain the DEK. Accordingly, if either the transmitting chip 202 or the receiving chip 204 fails, the chip may be replaced without forcing the replacement of the other.

Figure 3:
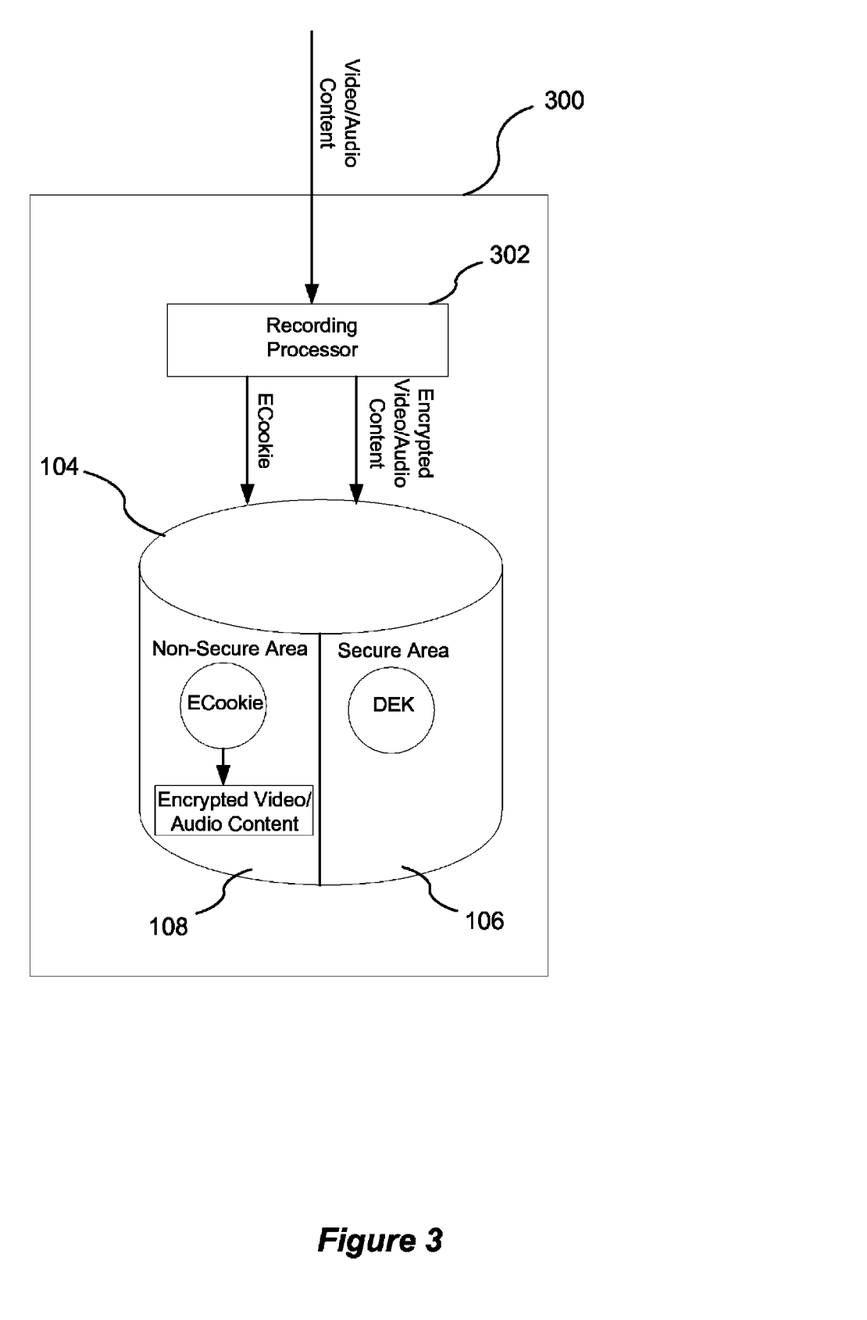
FIG. 3 illustrates a digital video recorder that utilizes the public key asymmetric encryption.

FIG. 3 illustrates a digital video recorder 300 that utilizes the public key asymmetric encryption. The digital video recorder 300 has a recording processor 302 that records a stream of video and audio content. The recording processor 302 encrypts the video and audio content by utilizing a DEK. Further, the DEK is stored in the secure area 106 of the storage medium 104 in the set top box digital video recorder 300 so that the recording processor may securely utilize the DEK. A public key of a KRK may be utilized to encrypt the DEK into an ECookie, which is stored in the non-secure area 108 of the storage medium 104 in the digital video recorder 300. As discussed above, an external device storing the private key of the KRK may be utilized to obtain the DEK. Accordingly, if the recording processor 302 fails, the recording processor 302 may be replaced without having to replace the entire digital video recorder 300.

Figure 4:
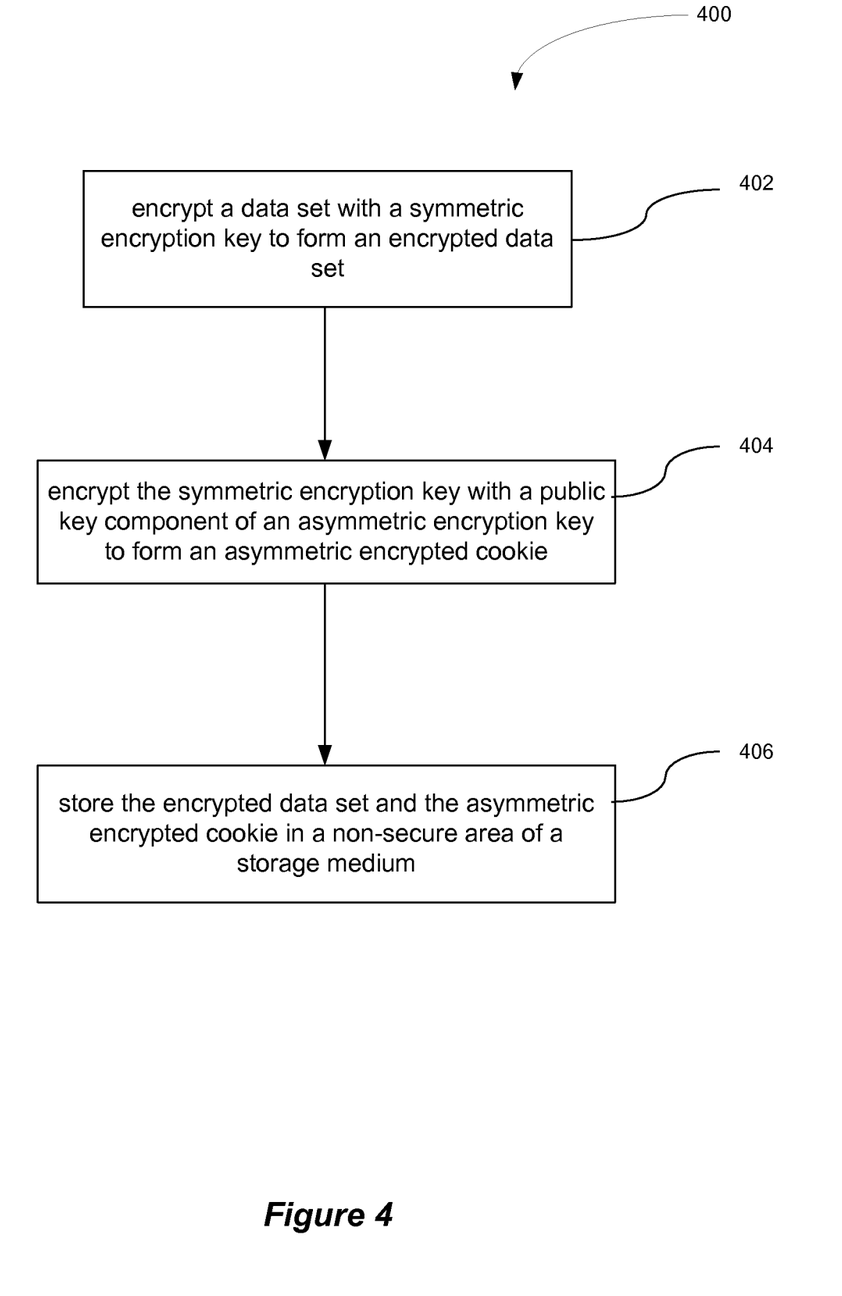
FIG. 4 illustrates a process that may be utilized by the device to implement public key asymmetric encryption.

FIG. 4 illustrates a process 400 that may be utilized by the device 100 to implement public key asymmetric encryption. At a process block 402, the process 400 encrypts a data set with a symmetric encryption key to form an encrypted data set. Further, at a process block 404, the process 400 encrypts the symmetric encryption key with a public key component of an asymmetric encryption key to form an asymmetric encrypted cookie. Finally, at a process block 406, the process 400 stores the encrypted data set and the asymmetric encrypted cookie in a non-secure area of a storage medium.

Figure 5:
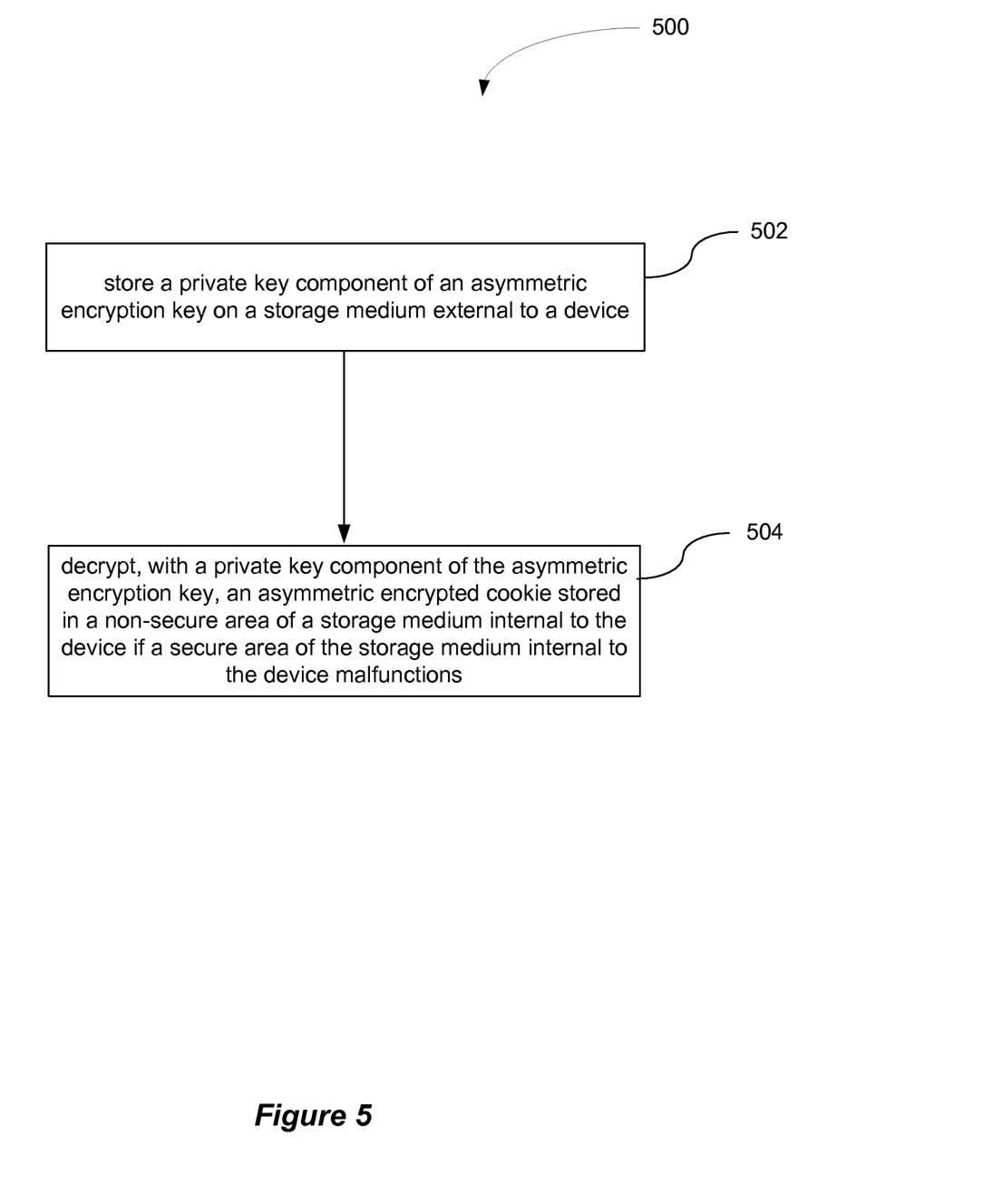
FIG. 5 illustrates a process that may be utilized by the external device to assist in data recovery for the device.

FIG. 5 illustrates a process 500 that may be utilized by the external device 110 to assist in data recovery for the device 100. At a process block 502, the process 500 stores a private key component of an asymmetric encryption key on a storage medium external to a device. Further, at a process block 504, the process 500 decrypts, with a private key component of the asymmetric encryption key, an asymmetric encrypted cookie stored in a non-secure area of a storage medium internal to the device if a secure area of the storage medium internal to the device malfunctions.

Figure 6:
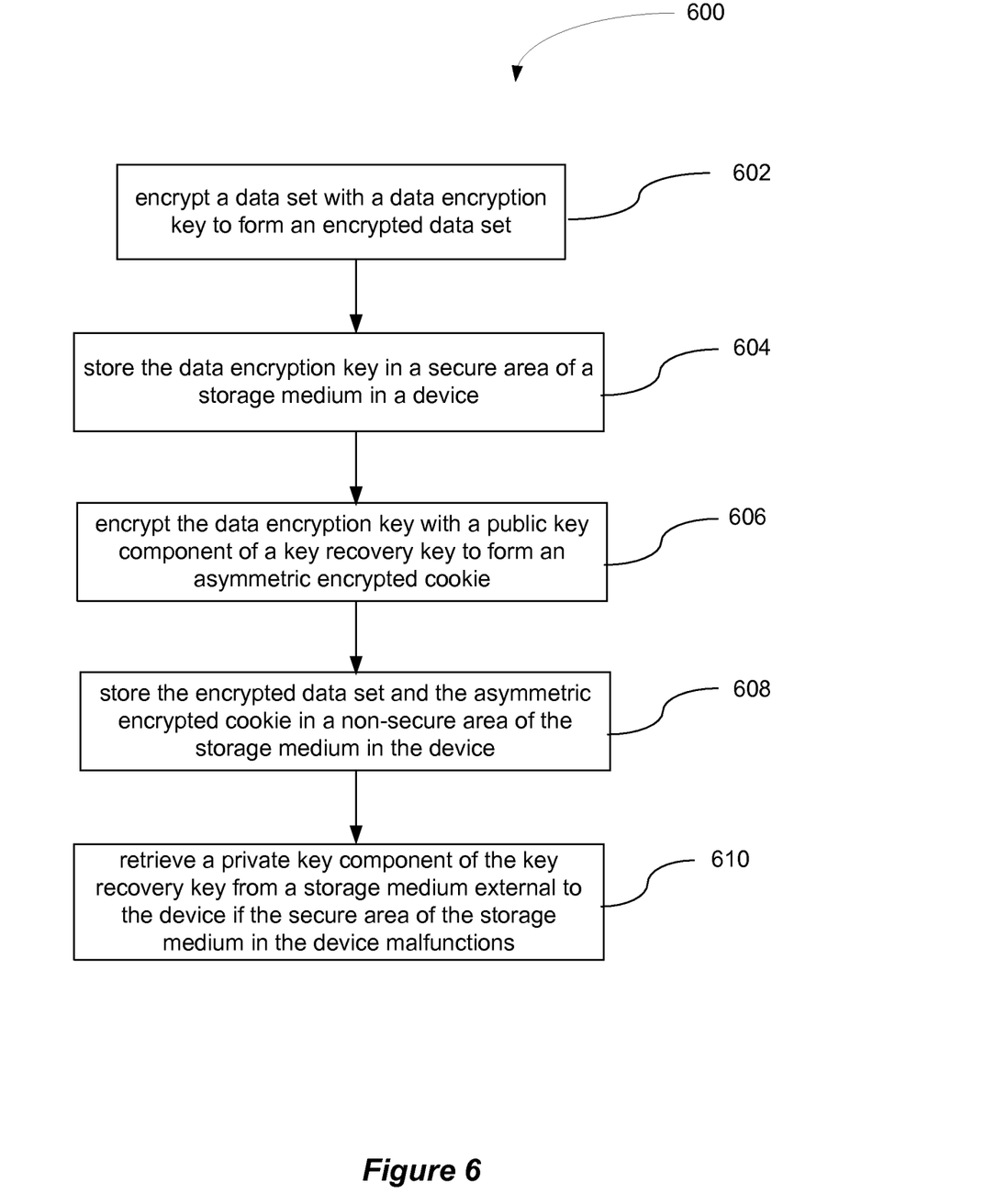
FIG. 6 illustrates a process that may be utilized to encrypt a data set and provide data recovery in the event of a malfunction.

FIG. 6 illustrates a process 600 that may be utilized to encrypt a data set and provide data recovery in the event of a malfunction. At a process block 602, the process 600 encrypts a data set with a data encryption key to form an encrypted data set. Further, at a process block 604, the process 600 stores the data encryption key in a secure area of a storage medium in a device. In addition, at a process block 606, the process 600 encrypts the data encryption key with a public key component of a key recovery key to form an asymmetric encrypted cookie. At a process block 608, the process 600 stores the encrypted data set and the asymmetric encrypted cookie in a non-secure area of the storage medium in the device. Finally, at a process block 610, the process retrieves a private key component of the key recovery key from a storage medium external to the device if the secure area of the storage medium in the device malfunctions.

Figure 7:
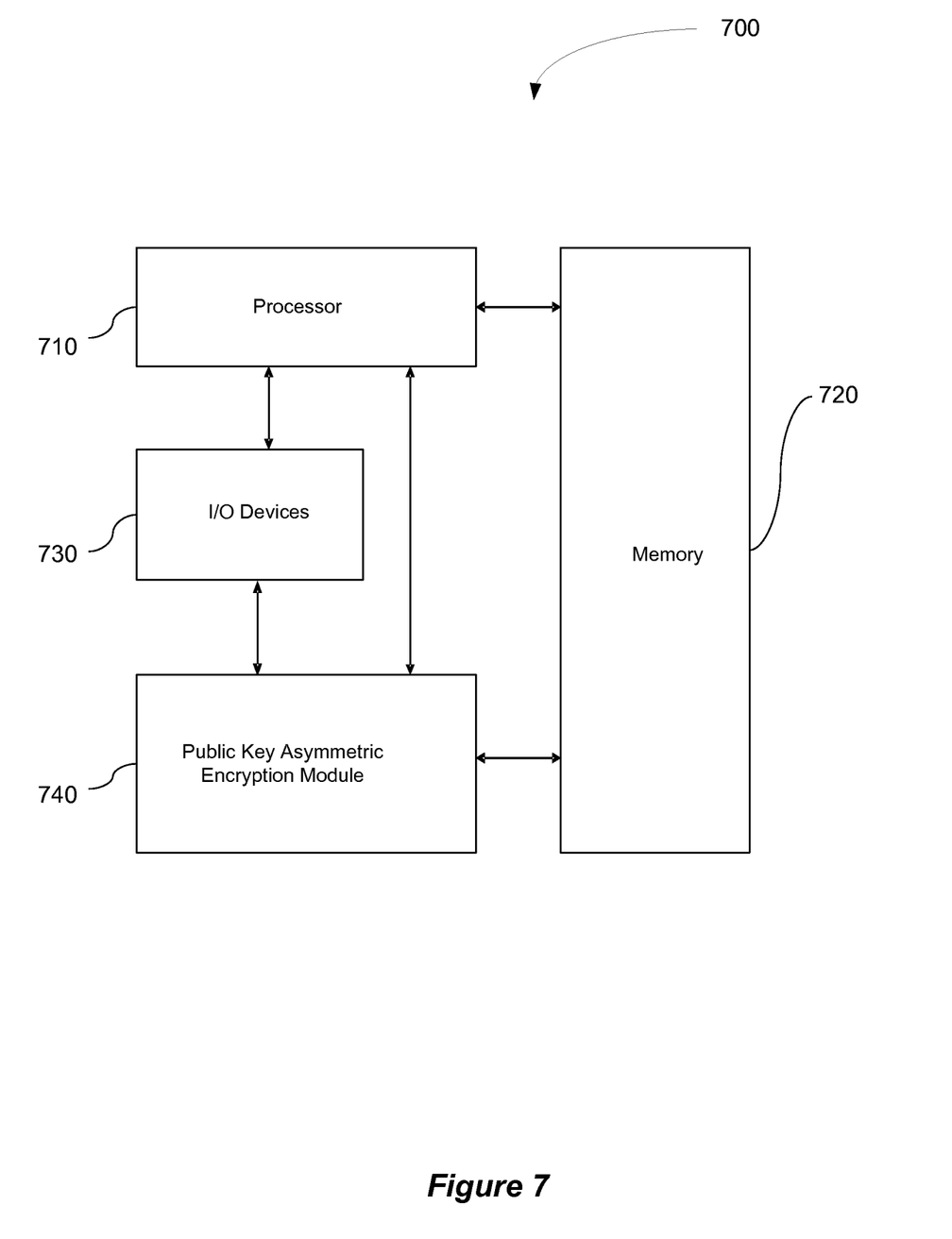
FIG. 7 illustrates a block diagram of a station or system that implements public key asymmetric encryption.

FIG. 7 illustrates a block diagram of a station or system 700 that implements public key asymmetric encryption. In one embodiment, the station or system 700 is implemented using a general purpose computer or any other hardware equivalents. Thus, the station or system 700 comprises a processor 710, a memory 720, e.g., random access memory ("RAM") and/or read only memory (ROM), a public key asymmetric encryption 740, and various input/output devices 730, (e.g., storage devices, including but not limited to, a tape drive, a floppy drive, a hard disk drive or a compact disk drive, a receiver, a transmitter, a speaker, a display, an image capturing sensor, e.g., those used in a digital still camera or digital video camera, a clock, an output port, a user input device (such as a keyboard, a keypad, a mouse, and the like, or a microphone for capturing speech commands)).

It should be understood that the public key asymmetric encryption module 740 may be implemented as one or more physical devices that are coupled to the processor 710 through a communication channel. Alternatively, the public key asymmetric encryption module 740 may be represented by one or more software applications (or even a combination of software and hardware, e.g., using application specific integrated circuits (ASIC)), where the software is loaded from a storage medium, (e.g., a magnetic or optical drive or diskette) and operated by the processor in the memory 720 of the computer. As such, the public key asymmetric encryption module 740 (including associated data structures) of the present disclosure may be stored on a computer readable medium, e.g., RAM memory, magnetic or optical drive or diskette and the like.

It is understood that the public key asymmetric encryption described herein may also be applied in other types of systems. Those skilled in the art will appreciate that the various adaptations and modifications of the embodiments of this method and apparatus may be configured without departing from the scope and spirit of the present method and system.

Therefore, it is to be understood that, within the scope of the appended claims, the present method and apparatus may be practiced other than as specifically described herein.

I claim:

1. A method comprising:
encrypting a data set with a symmetric encryption key to form an encrypted data set;
encrypting the symmetric encryption key with a public key component of an asymmetric encryption key to form an asymmetric encrypted cookie;
storing the encrypted data set and the asymmetric encrypted cookie in a non-secure area of a storage medium;
storing the symmetric encryption key in a secure area of the storage medium; and
retrieving a private key component of the asymmetric encryption key if the secure area of the storage medium malfunctions.

2. The method of claim 1, wherein the storage medium is located inside of a device that processes the data set.

3. The method of claim 2, wherein the private key component of the asymmetric encryption key is located on an additional storage medium that is distinct from the storage medium.

4. The method of claim 2, wherein the device is a set top box.

5. The method of claim 1, wherein the symmetric encryption key is a data encryption key.

6. The method of claim 1, wherein the asymmetric encryption key is a key recovery key.

7. A method comprising:
storing a private key component of an asymmetric encryption key on a storage medium external to a device; and
decrypting, with a private key component of the asymmetric encryption key, an asymmetric encrypted cookie stored in a non-secure area of a storage medium internal to the device if a secure area of the storage medium internal to the device malfunctions;
wherein the asymmetric encryption key has been encrypted with a public key component of the asymmetric encryption key.

8. The method of claim 7, wherein the asymmetric encrypted cookie is cipher text formed from an encryption of a symmetric key stored in the secure area of the storage medium internal to the device.

9. The method of claim 8, wherein an encrypted data set is stored in the non-secure area of the storage medium, the encrypted data set being formed from an encryption of a data set by the symmetric key.

10. The method of claim 9, wherein the symmetric encryption key is a data encryption key.

11. The method of claim 7 wherein the asymmetric encryption key is a key recovery key.

12. A method comprising:
encrypting a data set with a data encryption key to form an encrypted data set;
storing the data encryption key in a secure area of a storage medium in a device;
encrypting the data encryption key with a public key component of a key recovery key to form an asymmetric encrypted cookie;
storing the encrypted data set and the asymmetric encrypted cookie in a non-secure area of the storage medium in the device; and retrieving a private key component of the key recovery key from a storage medium external to the device if the secure area of the storage medium in the device malfunctions.

13. The method of claim 12, further comprising decrypting, with the private key component of the key recovery key, the asymmetric encrypted cookie to obtain the data encryption key.

14. The method of claim 13, further comprising decrypting, with the data encryption key, the encrypted data set to obtain the data set.

15. The method of claim 12, wherein the device processes the data set.

16. The method of claim 12, wherein the device is a set top box.

17. The method of claim 12, wherein the data includes audio and video data.

* * * * *